(12) United States Patent
Hochgraf

(10) Patent No.: US 7,883,809 B2
(45) Date of Patent: Feb. 8, 2011

(54) RAPID STARTUP OF A FUEL CELL POWER MODULE USING MOTOR DRIVE

(75) Inventor: Clark G. Hochgraf, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1581 days.

(21) Appl. No.: 11/196,052

(22) Filed: Aug. 3, 2005

(65) Prior Publication Data

US 2007/0029123 A1    Feb. 8, 2007

(51) Int. Cl.
*H01M 8/04*    (2006.01)
(52) U.S. Cl. .................. 429/434; 429/443; 429/440
(58) Field of Classification Search ............... None
See application file for complete search history.

(56) References Cited

U.S. PATENT DOCUMENTS 5,950,752 A * 9/1999 Lyons ................ 180/65.22
5,998,885 A * 12/1999 Tamor et al. .............. 307/10.1
2003/0010487 A1* 1/2003 Ieda et al. .................. 165/202

\* cited by examiner

*Primary Examiner*—Maria J Laios
(74) *Attorney, Agent, or Firm*—John A. Miller; Miller IP Group, PLC

(57) ABSTRACT

A technique for heating a fuel cell stack at stack start-up that includes using the vehicle motor drive system to generate waste heat independent from providing traction. Particularly, at fuel cell stack start-up, the electric traction inverter associated with the traction motor that drives the vehicle is controlled so that command signals provided by an inverter to a traction motor do not provide motor torque, but dissipates power into the motor windings and/or motor structure as waste heat. Thus, the output power generated by the fuel cell stack can be made high enough to quickly heat the fuel cell stack through inefficiencies in the stack operation, without providing driving torque. Additionally, the electric traction inverter can be operated so that waste heat is generated within the semiconductor power switches in the inverter.

16 Claims, 1 Drawing Sheet

RAPID STARTUP OF A FUEL CELL POWER MODULE USING MOTOR DRIVE

BACKGROUND OF THE INVENTION

1. Field of the Invention

This invention relates generally to a method for rapidly heating a fuel cell stack in a fuel cell system and, more particularly, to a method for rapidly heating a fuel cell stack in a fuel cell system at system start-up that includes using a drive motor, a drive motor inverter or other power conversion device to generate waste heat to allow the fuel cell stack to have a high load.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification, and control of catalyst poisoning constituents, such as carbon monoxide (CO).

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. The stack also includes flow channels through which a cooling fluid flows.

It is desirable during certain fuel cell stack operating conditions, such as fuel cell stack start-up, low power operation, low ambient temperature operation, etc., to provide supplemental heat to the fuel cell stack to provide the desired operating temperature, 60° C.-80° C., within the fuel cell stack for proper water management and reaction kinetics purposes. Particularly, the MEAs must have a proper relative humidity (RH) and the fuel cells must be within a certain temperature range to operate efficiently and produce the maximum output power.

At cold system start-up before the fuel cell stack has reached its desired operating temperature, the stack is generally unable to produce enough power to operate the vehicle. Therefore, the vehicle operator must wait a certain period of time until the fuel cell stack reaches its operating temperature as a result of stack inefficiencies before demanding significant load for operating the vehicle. Typical fuel cell stacks may take about 160 seconds or more to reach their operating temperature at which time they are able to provide power to operate the vehicle.

In a laboratory environment, heating the fuel cell stack can be accomplished by using a load bank to provide a controlled increase in load current to the stack, where the load current is limited based on the power available from the fuel cell stack. However, in the vehicle environment, road load is used to draw power from the fuel cell and cause it to heat up. However, the road load demand is not controlled by the fuel cell stack, but it is determined by the driver's demand. For example, if the driver starts the fuel cell engine and then drives at low speeds, the fuel cell stack will not warm up quickly and, as a result, the fuel cell stack will not be able to provide its full rated power if the driver suddenly demands it.

Existing methods to heat a fuel cell stack include the use of additional components, such as cell heaters or cooling fluid heaters and associated hardware for switching and controlling power to the heaters. However, the heaters and related hardware add cost, complexity and weight to the system, especially for heaters that would be large enough to achieve the desired stack operating temperature in the desired time. Also, hydrogen can be added to the cathode air or air can be added to the anode input to provide combustion and more quickly heat the stack. However, these techniques are limited because of the potential for degradation of the catalyst and its support structure, and the need to maintain safe gas compositions without the rapid release of excessive heat.

SUMMARY OF THE INVENTION

In accordance with the teachings of the present invention, a technique for heating a fuel cell stack at stack start-up is disclosed that includes: using the vehicle motor drive system to generate waste heat independent from providing traction. Particularly, at fuel cell stack start-up, an electric traction inverter associated with a traction motor that drives the vehicle is controlled so that the command signals provided by the inverter to the traction motor do not provide motor torque, but dissipates power into the motor windings and/or motor structure as waste heat. Thus, the output power generated by the fuel cell stack can be made high enough to quickly heat the fuel cell stack through inefficiencies during the stack operation, without providing driving torque.

Additionally, the electric traction inverter can be operated so that waste heat is generated within the semiconductor power switches in the inverter. In an alternate embodiment, a common cooling loop can be provided between the fuel cell stack, the electric traction inverter and the traction motor, where waste heat generated in, the traction inverter and/or the traction motor is used to heat the cooling fluid in the loop, which subsequently heats the fuel cell stack.

Additional features of the present invention will become apparent from the following description and appended claims, taken in conjunction with the accompanying drawings.

BRIEF DESCRIPTION OF THE DRAWINGS

FIG. 1 is a plan view of a fuel cell system including a motor traction drive system that is used to produce waste heat to

DETAILED DESCRIPTION OF THE EMBODIMENTS

Figure 1:
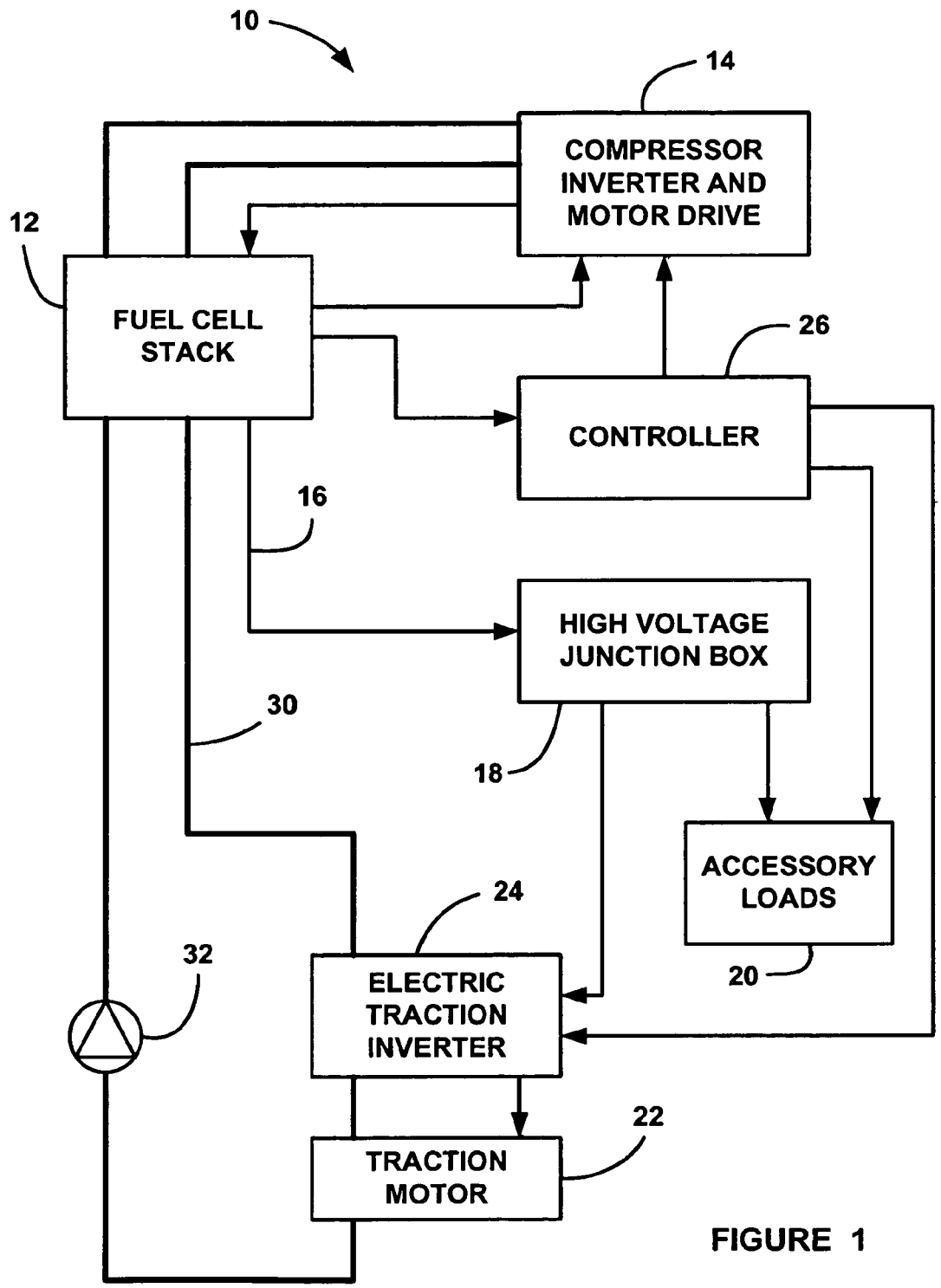

The following discussion of the embodiments of the invention directed to a technique for using a motor traction drive in a fuel cell system for heating a fuel cell stack at stack start-up is merely exemplary in nature, and is in no way intended to limit the invention or its applications or uses.

According to the present invention, the existing components in a fuel cell system are used to provide a controlled source of load current to the fuel cell stack in a vehicle fuel cell engine to rapidly heat the fuel cell stack at system start-up. Typically, the fuel cell system will include one or more motor drive systems, for example, a traction drive motor and traction inverter and an air compressor motor and associated inverter. Often, these drive systems are liquid cooled, and may share a common cooling fluid with the fuel cell stack.

Known traction motors are typically three-phase AC motors, such as interior permanent magnet machines, that include three coils in the motor stator. The stator coils receive three command signals from the inverter transformed from d- and q-axis current command signals that are 90° out of phase with each other to control the torque and speed of the motor. The inverter includes a plurality of power semiconductor switches, such as IGBTs, and diodes that provide the DC to AC inversion to convert the fuel cell stack DC current to an AC current for the stator coils. The command signals from the inverter sent to the traction motor include a magnitude, phase and frequency component that determine the operation of the motor for providing torque either in the forward or backward direction.

During normal operation, the traction motor and inverter are operated to propel the vehicle, and deliver road load power at high levels with minimal losses. However, according to the invention, the traction motor and inverter are also used to load the fuel cell stack and draw substantial power decoupled from the road load at system start-up so that the stack will quickly heat up to its operating temperature. Particularly, the flux vector and the current vector of the three command signals applied to the stator coils can be selectively controlled so that the losses within the motor are increased, without providing torque. This is possible because the motor has a power rating comparable to the full power rating of the fuel cell stack, and thus has a high thermal capacity for accepting waste heat in the coil windings and the steel laminations of the motor structure. Changing the control signals in this manner generally requires increasing the frequency of the signals to produce greater flux variations. One of ordinary skill in the art would readily recognize how to control the motor coil command signals to generate waste heat within the motor, without providing additional or any motor torque. In this manner, the road load can be zero, while power drawn from the fuel cell is dissipated as heat in the motor and the inverter.

The usual goal of the traction system is to efficiently convert electrical power to rotary mechanical power. By changing this objective to dissipating power into heat, the same traction drive components can be used as a controlled load bank without any tractive effort. The energy can be coupled as heat into one or more of the stator windings, the power semiconductor devices in the inverter, the stator iron, the rotor iron or a coolant loop system depending on which components are closely connected to the coolant system. The technique of the invention can also use the heat capacities of directly connected components if the coolant is not circulated, or can use the coolant loop heat capacity and warm it directly if coolant is circulated. Further, the waste heat can be used to heat the vehicle cabin or provide defrosting.

The motor traction inverter can be controlled to steer heat to either copper or iron motor parts in either the stator or rotor of the motor. The particular approach may vary for different coolant arrangements and motor constructions, for example, whether induction or permanent magnet motors are used. The losses can also be steered into the inverter power devices by purposely increasing switching losses through a variety of techniques. In other embodiments, the air compressor motor and inverter and/or another of the connected power electronic loads, whether connected to the coolant or not, can be used to generate waste heat as alternatives to the traction inverter and the motor.

FIG. 1 is a block diagram of a fuel cell system 10 including a fuel cell stack 12, where the system 10 employs the technique of heating the stack 12 at start-up discussed above. A compressor module 14 includes a compressor that provides air to the cathode side of the fuel cell stack 12. The compressor module 14 also includes a compressor inverter and motor drive system that operate the compressor. Power to drive the compressor module 14 is provided by the stack 12.

Output current on line 16 from the fuel cell stack 12 is provided to a high voltage junction box 18 that disperses the power to the various system loads, including accessory loads 20 and a traction motor 22, such as the three-phase AC motor discussed above. An electric traction inverter 24 provides the magnitude, phase and frequency command signals to the traction motor 22 in the manner as discussed above. A controller 26 controls the operation of the fuel cell stack 12, the compressor module 14 and the electric traction inverter 24, as is well understood in the art.

According to one embodiment of the invention, the controller 26 controls the traction inverter 24 at system start-up so that the output current on the line 16 can be made sufficiently high by providing the proper amount of hydrogen and air to the stack 12 to heat the stack 12 without providing traction for the vehicle. Particularly, the controller 26 controls the inverter 24 so that the command signals applied to the traction motor 22 selectively generate waste heat in the motor 22 without providing motor torque. Those skilled in the art will readily recognized how the three-phase command signals applied to the traction motor 22 can be controlled by the switches within the inverter 24 so that the signals are used to generate heat into the stator windings, the stator or rotor iron, or the inverter switches without providing torque. Depending on the demand provided by the vehicle operator for traction torque, the command signals can also be selectively controlled so that the desired amount of torque is provided, and the rest of the power is dissipated as heat in these components. Because the traction motor 22 has a high power rating equivalent to or greater than the maximum power available from the stack 12, any amount of torque between zero and 100% can be provided, with the additional power being used to generate the waste heat.

The compressor motor and the compressor motor inverter within the compressor module 14 can also be used to generate waste heat without providing additional airflow to the cathode side of the stack 12. Particularly, the compressor motor and the compressor motor inverter can be inefficiently operated in the same manner as discussed above for the traction motor 22 and inverter 24, so that waste heat is generated within the compressor motor and/or compressor motor inverter to increase the load on the stack 12, and thus increase the temperature of the stack 12. However, the compressor motor is generally much smaller than the traction motor 22, so that the thermal capacity of the compressor motor can only accept a small portion of the output power of the stack 12 as heat.

According to another embodiment of the invention, a cooling fluid loop 30 is provided that directs a cooling fluid through the fuel cell stack 12, the inverter 24, the traction motor 22 and the compressor module 14. Although the cooling fluid loop 30 provides cooling fluid to all of the fuel cell stack 12, the inverter 24, the traction motor 22 and the compressor module 14 in this embodiment, the cooling fluid loop 30 can provide the cooling fluid to an desirable combination of these components in other embodiments. Also, more than one cooling fluid loop can be provided. A pump 32 pumps the cooling fluid through the cooling fluid loop 30. Because the fuel cell stack 12, the inverter 24, the traction motor 22 and the compressor module 14 share a common coolant loop, waste heat generated in any of these components during start-up as discussed above can be used to heat the cooling fluid, which will then heat the stack 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack;
    an electric traction inverter powered by the fuel cell stack;
    a traction motor responsive to command signals from the traction inverter; and
    a controller configured to control the system, said controller controlling the traction inverter so that the command signals from the traction inverter to the traction motor generate waste heat in the traction motor independent from generating torque, wherein the waste heat generated in the traction motor is used to provide an increased load for the stack to allow the stack to quickly heat up.

2. The fuel cell system according to claim 1 wherein the controller also controls switches within the traction inverter to generate waste heat within the traction inverter, where the waste heat is used to further provide an increased load for the stack to further allow the stack to quickly heat up.

3. The fuel cell system according to claim 1 wherein the control switches are semiconductor switches.

4. The fuel cell system according to claim 2 further comprising a common coolant loop for providing a cooling fluid to the fuel cell stack and the traction inverter, wherein the waste heat generated in the traction inverter is used to heat the cooling fluid to heat the fuel cell stack.

5. The fuel cell system according to claim 1 wherein the waste heat is used for cabin heating or defrosting.

6. The fuel cell system according to claim 1 further comprising a common coolant loop for providing a cooling fluid to the fuel cell stack and the traction motor, wherein the waste heat generated in the traction motor is used to heat the cooling fluid to heat the fuel cell stack.

7. The fuel cell system according to claim 1 wherein the waste heat is dissipated in the motor windings and/or in a structure of the motor.

8. The fuel cell system according to claim 1 wherein the fuel cell system is on a vehicle and the controller generates the waste heat in the motor at fuel cell system start-up.

9. The fuel cell system according to claim 1 wherein the traction motor is a three-phase AC motor.

10. A method for controlling the operation of a fuel cell system, said method comprising;
    providing a power signal from a fuel cell stack to an electric traction inverter;
    providing command signals from the electric traction inverter to a traction motor; and
    controlling the command signals from the electric traction inverter so that waste heat is generated in the traction motor independent from generating motor torque, wherein the waste heat generated in the motor is used to provide an increased load for the stack to allow the stack to quickly heat up.

11. The method according to claim 10 further comprising controlling control switches within the traction inverter to generate waste heat within the traction inverter, where the waste heat generated is used to further provide an increased load for the stack to further allow the stack to quickly heat up.

12. The method according to claim 10 wherein controlling control switches includes controlling semiconductor switches.

13. The method according to claim 11 further comprising providing a common coolant loop between the fuel cell stack and the traction inverter, wherein controlling control switches within the traction inverter to generate waste heat within the traction inverter includes using the waste heat generated in the traction inverter to heat a cooling fluid in the coolant loop to heat the fuel cell stack.

14. The method according to claim 13 wherein providing a common coolant loop includes providing the common loop to the traction motor, wherein the waste heat generated in the traction motor is used to heat the cooling fluid to heat the fuel cell stack.

15. The method according to claim 10 wherein the waste heat is dissipated in the motor windings and/or in a structure of the motor.

16. The method according to claim 10 wherein providing command signals from the electric traction inverter to a traction motor includes providing command signals to a three phase AC traction motor.

* * * * *